(12) United States Patent
Fukami et al.

(10) Patent No.: US 12,538,925 B2
(45) Date of Patent: Feb. 3, 2026

(54) AGRICULTURAL COMPOSITION COMPRISED OF THREE SPECIES OF BACILLUS AND MIXED TOCOPHEROLS OF VEGETABLE ORIGIN, WITH POTENTIALIZER EFFECT OF THE BIOFUNGICIDE MECHANISMS AND UV PROTECTION FOR AGRICULTURAL APPLICATION, AND PROCESS OF PRODUCING SAME

(71) Applicant: TOTAL BIOTECNOLOGIA INDUSTRIA E COMERCIO S.A., Curitiba (BR)

(72) Inventors: Josiane Fukami, Vinhedo (BR); Douglas Fabiano Gomes, Vinhedo (BR); Juliana Marcolino Gomes, Vinhedo (BR); Jonas Hipolito De Assis Filho, Vinhedo (BR)

(73) Assignee: TOTAL BIOTECNOLOGIA INDÚSTRIA E COMERCIO S.A. (BR)

( * ) Notice: Subject to any disclaimer, the term of this patent is extended or adjusted under 35 U.S.C. 154(b) by 343 days.

(21) Appl. No.: 18/254,555

(22) PCT Filed: Jun. 23, 2021

(86) PCT No.: PCT/BR2021/050275
§ 371 (c)(1),
(2) Date: May 25, 2023

(87) PCT Pub. No.: WO2022/266731
PCT Pub. Date: Dec. 29, 2022

(65) Prior Publication Data
US 2024/0074441 A1   Mar. 7, 2024

(51) Int. Cl.
| | | |
|---|---|---|
| *A01N 63/22* | (2020.01) | |
| *A01N 43/16* | (2006.01) | |
| *A01P 3/00* | (2006.01) | |
| *C12N 1/20* | (2006.01) | |
| *C12R 1/125* | (2006.01) | |

(52) U.S. Cl.
CPC ............. *A01N 63/22* (2020.01); *A01N 43/16* (2013.01); *A01P 3/00* (2021.08); *C12N 1/20* (2013.01); *C12R 2001/125* (2021.05)

(58) Field of Classification Search
CPC ....................................... A01N 63/22
See application file for complete search history.

(56) References Cited

U.S. PATENT DOCUMENTS

| | | |
|---|---|---|
| 2016/0227788 A1 | 8/2016 | Frank |
| 2019/0174767 A1 | 6/2019 | Greenshields |
| 2020/0359653 A1 | 11/2020 | Johnson |

FOREIGN PATENT DOCUMENTS

| | | |
|---|---|---|
| CN | 103734499 A | 4/2014 |
| CN | 106922951 A | 7/2017 |
| WO | WO 2009/126473 A1 | 10/2009 |
| WO | WO 2017/137353 A1 | 8/2017 |
| WO | 2019206820 A1 | 10/2019 |

OTHER PUBLICATIONS

International Search Report and Written Opinion for Application No. PCT/BR2021/050275, with English Translation, 19 pages.
Extended European Search Report issued in corresponding EP patent application No. 21946282.7 on Feb. 4, 2025, 12 pages.

*Primary Examiner* — Albert M Navarro
(74) *Attorney, Agent, or Firm* — Orrick, Herrington & Sutcliffe, LLP

(57) ABSTRACT

The present invention is related to an agricultural composition comprised by the association of three species of *Bacillus* spp (*Bacillus pumilus, Bacillus subtilis, Bacillus velezensis*) in their resistance form and the vegetable extract comprised by mixed tocopherols, for potentializing the biofungicide effect and, surprisingly, with high stability in face of the UV-B radiation in a single industrial product reached by a differentiated industrial process. The industrial process spore formation induction of *Bacillus* spp. through the osmotic stress of the vegetative cells in the culture medium during the bacterial growth is what enables the mixture of *Bacillus* spp. and the mixed tocopherols since there exists antagonism between the species of *Bacillus* in their respective vegetative forms. Finally, the synergism between the active principles, microbial cells, and mixed tocopherols with antioxidant action, activates and potentializes the biofungicide function of the biotechnological composition presented.

14 Claims, 2 Drawing Sheets

AGRICULTURAL COMPOSITION COMPRISED OF THREE SPECIES OF BACILLUS AND MIXED TOCOPHEROLS OF VEGETABLE ORIGIN, WITH POTENTIALIZER EFFECT OF THE BIOFUNGICIDE MECHANISMS AND UV PROTECTION FOR AGRICULTURAL APPLICATION, AND PROCESS OF PRODUCING SAME

CROSS-REFERENCE

This application is a U.S. National Stage filing of International Patent Application No. PCT/BR2021/050275, filed Jun. 23, 2021, which is incorporated herein by reference in its entirety.

FIELD OF INVENTION

The present invention is related to an agricultural composition and the use of two or more species of the *Bacillus* genre associated with mixed tocopherols, for potentializing the fungicide effect and UV protection of the microorganisms and metabolites. The invention presented contemplates the industrial process and potential agricultural application of same.

DESCRIPTION OF RELATED TECHNOLOGY

Agriculturally important diseases comprise a series of harmful physiological processes caused to the host through the infection generated by a phytopathogen agent, and as consequence they express the visible symptoms that compromise the quality and/or economic value of the culture (CHAVES & ZAMBOLIM, 1985). Among the agents that cause diseases, the fungi are the most impacting, since they present great diversity and affect different agricultural cultures, among them soybean (*Glycine max*), wheat (*Triticum aestivum*), corn (*Zea mays*), coffee (*Coffea* sp.), beans (*Phaseolus vulgaris*) and sugarcane (*Saccharum officinarum*), apart from the horticultural crops.

In soybean, different species of phytopathogenic fungi cause damages to the culture, from the initial phases of the vegetative stage, appearing as widely known diseases, the Anthracnose (*Colletotrichum truncatum*) being outstanding among them, Asian soybean rust (*Phakopsora pachyrhizi* and *P. meibomiae*); target spot and *Corynespora* root rot (*Corynespora cassiicola*), tan spot (*Septoria glycines*), white mold (*Sclerotinia sclerotiorum*), among others. For other cultures, the wheat rust (*Puccinia triticina*) and coffee rust (*Hemileia vastatrix*), the white mold in beans, the corn anthracnose (*Colletotrichum graminicola*) and the sugarcane red rot (*Colletotrichum falcatum*) also cause great economic losses to the agriculture, since they negatively impact each one's yield. For this reason, different approaches are employed for the control of phytopathogenic fungi, which, most of the time, are divided between the chemical and the biological control, through two main methods of application, the treatment of the seeds and the foliar spraying (PICININI e FERNANDES, 2003).

The application of fungicides for the chemical control of Asian soybean rust, in the 2016/2017 crop, reached a cost of R$8,3 billion (CEPEA 2017). Still according to the CEPEA, the lack of control of this disease would generate losses close to R$12 billion to the farmers. Despite the efficient control of phytopathogenic fungi reached with the adoption of chemical fungicides, the high cost, the accumulation of chemical residues in the foods and environment goes against the practices that contribute to the sustainability of the agribusiness. Apart from these disadvantages, the acquisition of resistance, when the phytopathogenic fungi acquires tolerance for the chemical molecule employed, can lead to the selection of fungal lineages that are difficult to control, generating imbalance and, consequently, strong impact on agriculture.

As an alternative to the chemical control of phytopathology caused by fungi in cultures that have economic importance, the emphasis is on the biological control. In this context, technologies based on natural compounds stemming from plants and biological products, originating from the fermentative processes of microorganisms, have presented important results for the handling of diseases caused by fungi. In general, the biological control offers advantages over the use of conventional control methods, such as lower costs, ease of application, transformation, or recovery of contaminated soils, apart from not leaving residues in the environment, as occurs with many chemical products (SOARES, 2006; NUNES, 2008). Therefore, this practice shows itself to be an important tool for greater agricultural Sustainability.

Widely used in biological control, bacteria of the *Bacillus* genre are widely disclosed in nature with the ability of producing large quantities of enzymes and a varied range of antibiotics, which makes them excellent agents for promoting plant growth and biological handling of phytopathogens, including fungi. Additionally, they have the ability to form resistance structures in abiotic stress conditions known as endospores, increasing their survival in unfavorable environments and, when industrially induced, guarantee the stability of the product for long periods of storage.

There are several species of *Bacillus* reported as presenting biofungicide effect, among them *Bacillus pumilus* (AGARWAL et al., 2017), *B. subtilis* (DORIGHELO et al., 2020), *B. amyloliquefaciens* (SIAHMOSHTEH et al., 2018), *B. velezensis* (CALVO et al., 2020), *B. megaterium* (MANNAA et al., 2017) and *B. licheniformis* (HASSAN et al., 2019). Among these, *B. pumilus* has as main action mechanisms directed to the biocontrol of phytopathogenic fungi the biosynthesis of hydrolytic and antimicrobial enzymes, such as, for example chitinases and surfactins, respectively. Another action mechanism directed to the mitigation of fungal diseases in agriculture consists in the biosynthesis of volatile organic compounds (VOCs), responsible for the antagonism presented by *B. velezensis* in the face of several phytopathogens such as *Botrytis cinerea*, Monilinia fructicola, *M. laxa, Penicillium italicum, P. digitatum* and *P. expansum*. Apart from these, the cyclic lipopeptides such as iturin A characteristic to the *B. subtilis*, also show themselves as important action mechanisms for the inhibition of phytopathogenic fungi. Therefore, the combination of these three species contemplates a large variety of action mechanisms and, when associated with a product destined to biocontrol, can perform an excellent biofungicide role.

It is important to emphasize the possibility of the occurrence of incompatibility among the different species of *Bacillus*, whereby this is a question to be considered when the approach is the biotechnological composition in a single agricultural product. There exist reports as to the incompatibility between the vegetative cells of different *Bacillus*, which is evident in in vitro trials (GOMES et al., 2003). However, for in vivo trials, it was found that the mix of distinct *Bacillus* can increase suppression of diseases (DE BOER, 1999). Duffy et al. (1996) reported that the co-inoculation of different microorganisms acts in distinct regions of the roots, and thus the inhibition of the action of these microorganisms does not occur, or even because the production of inhibiting secondary compounds occurs in the stationary stage of the growth of these microorganisms, for this reason the combination of different species of Bacillus in a single product needs to meet the compatibility between them.

One alternative to meet the compatibility requirement consists in searching ways of stabilizing the product to guarantee the presence of all the species in optimal concentrations until the application, thus guaranteeing the expected performance. This can be industrially accessed through a process of induction of the formation of endospores, which requires specific stimulation for the cells to assume this form of resistance. When in this condition the endospores are able to survive several bactericide treatments compared to the gram-negative bacteria or Bacillus in the vegetative form thereof, such as temperatures up to 100° C., ionizing radiation, chemical solvents, detergents, and hydrolytic enzymes (ERRINGTON, 2003).

Still regarding solutions for the biological control of diseases caused by fungi that are agriculturally important, the botanical extracts are held as having great potential for biotechnological application, since they are rich in biologically active natural ingredients (CORRÊA and SALGADO, 2011; CHITWOOD, 2002; COSTA, et al., 2014; FERREIRA, SOUZA and FARIA, 2007), among which, several have been reported as being fungicidal agents (SARMENTO-BRUM, 2012).

The bioactive compounds obtained from plants derive from different extraction processes, as from solvents having different polarities, generating mainly alcoholic extracts (ANDRADE et. al, 2016), aqueous extracts or hydrolacts (CAVALCANTE et al., 2006) and essential oils (MARANGONI, et al. 2013). The essential oils stand out among the botanic extracts by being comprised of complex mixtures with predominance of terpenes, oxygenated terpenes, diterpenes, sesquiterpenes, and other components with high biological activity (SERAFINI et al., 2001).

The formulations of biological products comprised of microorganisms and botanical extracts allows obtaining unique solutions for the application in the biocontrol of pests and diseases having agricultural importance. Within this context, the combination of different action mechanisms with fungicide effect practiced by microorganisms and bioactive compounds of natural extracts is rather obvious. However, surprising effects can be reached when the biotechnological composition presents bacteria renowned as biofungicides with natural extracts without any report associated to biocontrol actions of phytopathogenic fungi.

The tocopherols, for example, obtained from the soybean, sunflower and other vegetable oil extracts, are mixes of different molecules of vitamin E with high antioxidant action (GUINAZ et al., 2009). In isolated form, these compounds do not present fungicide action, however, when added to the composition of an agricultural solution comprised of B. pumilus, B. velezensis and B. subtilis, promoted, in a surprising manner, a notable increase in quantitative parameters referring to the biocontrol of different species of phytopathogenic fungi.

Among the biological properties of the tocopherols their pronounced antioxidant action stands out. Antioxidants are comprised of compounds that retard or inhibit the oxidation of the cellular components (lipids, nucleic acids), by blocking the start or propagation of oxidative chain reactions, preventing cellular damage (TACHKITTIRUNGROD et al., 2007). Additionally, it is known that the antioxidant effect is a key mechanism of the photoprotective activity of botanical extracts. This is because the cellular damages caused by UV radiation result mainly from the action of reactive oxygen species (from the English, reactive oxygen species—ROS), which cannot be neutralized by the action of antioxidants (RADICE et al., 2016). Notably, the tocopherol mix described in this document presented outstanding photoprotective property, protecting the bacterial cells against the deleterious effects of the exposure to UV radiation.

The stabilization of aqueous mixtures, product of the fermentation of microorganisms in their respective culture media and vegetable extract oil compounds, which present important functions in the biocontrol of pests and diseases having agricultural importance, need to undergo a stabilization process. This process consists of the addition of emulsifier agents, among them Tween 80, sodium Tripolyphosphate, Polyethylene glycol, silicon, and sodium Lauryl sulphonate, which alter the physical properties of solutions, making water and oil mixtures miscible and homogeneous.

Thus, the biotechnological solution presented, comprised of botanical extract rich in tocopherols and three species of the Bacillus genre, in a single formulation, promotes a surprising effect in the biocontrol of phytopathogenic fungi, whereby this effect is presented and claimed in the present invention.

REFERENCES

BERNARDO, R.; SCHAWAN-ESTRADA, K. R. F. STANGARLIN, J. R.; OLIVEIRA, J. S B.; CRUZ, M E. S.; MESQUINI, R. M. In vitro fungitoxic activity of plant extracts on the mycelial growth of phytopathogenic fungi. Scientia Agraria Paranaensis, v. 14, n. 2, p. 89-93, 2015.

CALVO, MENDIARA, I.; ARIAS, E.; GRACIA, A. P. BLANCO, D.; VENTURINI, M. E. Antifungal activity of the volatile organic compounds produced by Bacillus velezensis strains against postharvest fungal pathogens, *Postharvest Biology and Technology*. v. 166, 2020.

CHAVES, G. M., ZAMBOLIM, L. Concept of diseases in plants. Informe Agiopecuario, Belo Horizonte, v. I, n. 122, p. 6-7, fev. 1985.

CEPEA—Advanced Studies Center in Applied Economy. Special study on the economical mensuration of the incidence of pests and diseases in Brazil. Piracicaba-SP, 2017.

DORIGHELLO, D. V., FORNER, C., de CAMPOS LEITE, R. M. V. B. et al. Management of Asian soybean rust with Bacillus subtilis in sequential and alternating fungicide applications. *Australasian Plant Pathol*. v. 49, p. 79-86, 2020.

GOMES, A. M. A.; MARIANO, R. L. R.; SILVEIRA, B.; MESQUITA, J. C. P. Isolation, selection of bacteria and effect of Bacillus spp. in the production of organic lettuce seedlings. Brazilian Horticulture, v. 21, p. 699-703, 2003.

GUINAZ, Michele et al. Tocopherols and tocotrienols in vegetable oils and eggs. Quím. Nova, São Paulo, v. 32, n. 8, p. 2098-2103, 2009.

MANNAA, M; YEON OH, J; KIM, K. D. Biocontrol Activity of Volatile-Producing Bacillus megaterium and Pseudomonas protegens against Aspergillus flavus and Aflatoxin Production on Stored Rice Grains, *Mycobiology*, v. 45, n. 3, p. 213-219, 2017.

NUNES, H. T. Microbial agents in the control of nematodes and phytopathogenic fungi in soybeans and their compatibility with agrichemicals. 2008. 75 f. Thesis (Doctorate) Agricultural Microbiology Course., Pauldsta State University. Agricultural and Veterinary Sciences College, Jaboticabal Campus, Jaboricabal, 2008.

PICININI, Edson Clodoveu; FERNANDES, Jose Mauricio Cunha. Effect of the treatment of seeds with fungicide over the control of diseases in the aerial part of wheat. *Brazilian Phytopathology*, v. 28, n. 5, p. 515-520, 2003.

RADICE M, MANFREDINI S, ZIOSI P, DISSETTE V, BUSO FALLACARA A, VERTUANI S. Herbal extracts, lichens, and biomolecules as natural photo-protection alternatives to synthetic UV filters. A systematic review. *Fitoterpaia*. 114:144-162. 2016.

SARMENTO-BRUM, R. B. C. Effect of essential oils in the control of phytopathogenic fungi. Gurupi-TO. 2012, 135 f. Dissertation (master's degree in vegetable production)—Vegetable Production Post-Graduation Program. Tocantins Federal University, 2012.

SIAHMOSHTEH, F.; HAMIDI-ESFAHANI, Z.; SPADARO, D.; SHAMS-GHAHFAROKHI, M.; RAZZAGHI-ABYANEH, M. Unraveling the mode of antifungal action of *Bacillus subtilis* and *Bacillus amyloliquefaciens* as potential biocontrol agents against aflatoxigenic *Aspergillus parasiticus*, Food Control, v. 89, 2018.

SOARES, P. L. M. Study of the biological control of Phyto nematodes with nematophagous fungi. 2006. 252 f. Thesis (Doctorate)—Agronomy Course, Paulista State University "Júlio De Mesquita Filho" Agricultural and Veterinary Sciences College, Jaboticabal, 2006. Cap. 01.

TACHAKITTIRUNGROD, S., OKONAGI, S. & CHOWWANAPOONPOHN. (2007). Study on antioxidant activity of certain plants in Thailand: Mechanism of antioxidant action of guava leaf extract. Food Chemistry. 103: 381-388.

UL HASSAN, Z.; AL THANI, R.; ALNAIMI, H.; MIGHELI, Q.; JAOUA, S. Investigation and Application of *Bacillus licheniformis* Volatile Compounds for the Biological Control of Toxigenic *Aspergillus* and *Penicillium* spp. *ACS Omega*. v. 4, n. 17, p. 17186-17193, 2019.

CHAVES, G. M., ZAMBOLIM, L. Concept of diseases in plants. Informe Agropecuáro, Belo Horizonte, v. 11, n. 122, p. 6-7, fev. 1985.

CEPEA—Advanced Studies Center in Applied Economy. Special study on the economical mensuration of the incidence of pests and diseases in Brazil. Piracicaba-SP, 2017.

SOARES, P. L. M. Study of the biological control of phyto-nematodes with nematophagous fungi. 2006. 252 f. Thesis (Doctorate)—Agronomy Course, Paulista State University "Júlio De Mesguita Filho" Agricultural and Veterinary Sciences College, Jaboticabal, 2006. Cap. 01.

REISS, A.; JORGENSEN, L. N. Biological control of yellow rust of wheat (*Puccinia striiformis*) with Serenade®ASO (*Bacillus subtilis* strain QST713), *Crop Protection*, v. 93, 2017.

SUMMARY OF THE INVENTION

The present invention teaches that, surprisingly, it is possible to develop a biotechnological solution (on industrial scale), containing two or more species of *Bacillus* in its resistance form—endospores—which, when associated with mixed tocopherols, enhances the effect of biocontrol against fungi having great agricultural importance.

The present invention further provides an agricultural composition produced by the method of the present invention, as well as the use of same in agriculture.

Advantageously, the present invention allows obtaining a biofungicide agricultural composition with high stability among the different active ingredients, *Bacillus*, and mixed tocopherols.

Further, surprisingly, the present invention provides additional parameters to the method of production of an agricultural composition formed by two or more species of fermented *Bacillus* on industrial scale, demonstrating the necessary parameters for the cellular sporulation, such as pressure parameters, temperature, oxygenation (air volume and agitation) and culture media, enabling to obtain a biotechnological product.

As will be understood by a person skilled in the art, different species of *Bacillus* can be used, as well as different parameters for fermentation and composition of the cultivation media can be combined for the present invention.

In a first embodiment, the present invention provides a process for producing an agricultural composition comprising the steps of:
  (a) fermentation of the microorganisms comprising three species belonging to the *Bacillus* genre, namely *B. velezensis*, *B. pumilus* and *B. subtilis*, to obtain an agricultural composition with biofungicide effect, through the imposition of a modality of osmotic stress during the industrial process; and
  (b) formulation of a commercial biotechnological product comprised of a mixture of bacteria and mixed tocopherols, in a technical solution which allows the mixture of the parts with high stability, presented in a single package.

In a surprising manner, the present invention has as the preferred embodiment thereof potentializing the biofungicide effect of the three *Bacillus* associated with the mixed tocopherols. In a secondary embodiment, in a surprising manner, the present invention is able to promote the protection of the *Bacillus* spp. from UV-B radiation (present in sunlight) by means of the addition of tocopherols.

In an unexpected manner, the mixed tocopherols by themselves did not present any fungicide effect against different species of phytopathogenic fungi with agronomic interest. But, surprisingly, the biofungicide effect of the *Bacillus* spp. observed is potentialized when the mixed tocopherols are added, compared to that presented by the consortium of *Bacillus* spp. in the absence of this natural extract.

The compatibility provided by obtaining the agricultural composition in a single formulation, results from the industrial fermentation process and induction of the formation of endospores by *Bacillus* cells. This phenomenon was reached, in a surprising manner, by imposing a modality of osmotic stress during the fermentative process for the cellular multiplication. The endospores are known resistance structures for positive Gram bacteria cells, however, the industrial solution guarantees the induced sporulation with high efficiency and stability, at a rate higher than 90% and concentrations above $10^8$ endospores/mL, independent of random factors.

In an alternative embodiment, the present invention provides a product with high protection of the *Bacillus* spp against UV-B radiation present in the solar rays. Preferably, the use is for application via foliar spraying.

BRIEF DESCRIPTION OF THE FIGURES

For a more complete understanding of the invention, reference must now be made to the embodiments of the invention illustrated in a more detailed manner in the attached figures and described by means of the embodiments of the invention.

*Results of 15 treatments and 4 repetitions, data not presented since they are not relevant to the study. Means followed by equal letters do not differ from each other by the Tukey test at 5% significance.
*Results of 15 treatments and 4 repetitions, data not presented since they are not relevant to the study. Means followed by equal letters do not differ from each other by the Tukey test at 5% significance.

Figure 1:
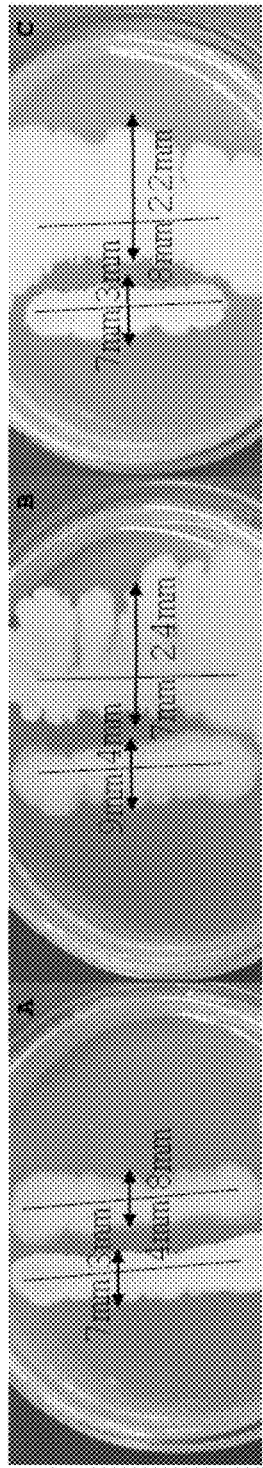
FIG. 1 illustrates the antagonist effect between the three *Bacillus*; A. *Bacillus pumilus*×*Bacillus subtilis*. B. *Bacillus subtilis*×*Bacillus velezensi*. C. *Bacillus pumilus*×*Bacillus velezensis*, in their respective vegetative forms.
Figure 2:
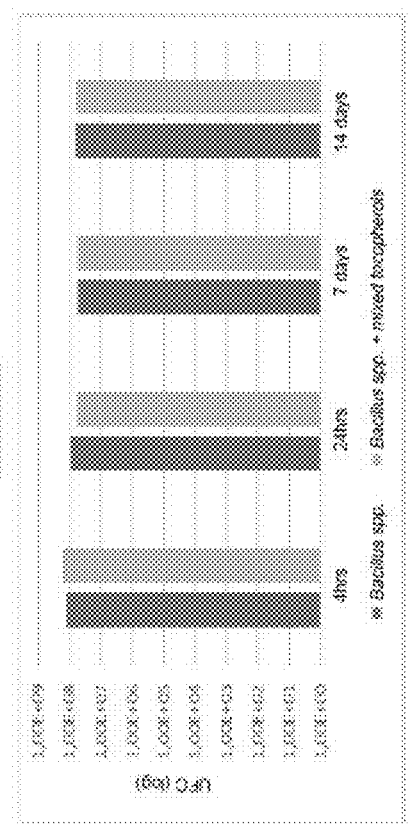
FIG. 2 demonstrates the compatibility of the *Bacillus* spp. cells with mixed tocopherols submitted to accelerated aging stored at 54° C. for up to 14 days. * Transformed data to log 14 (x+1).
Figure 3:
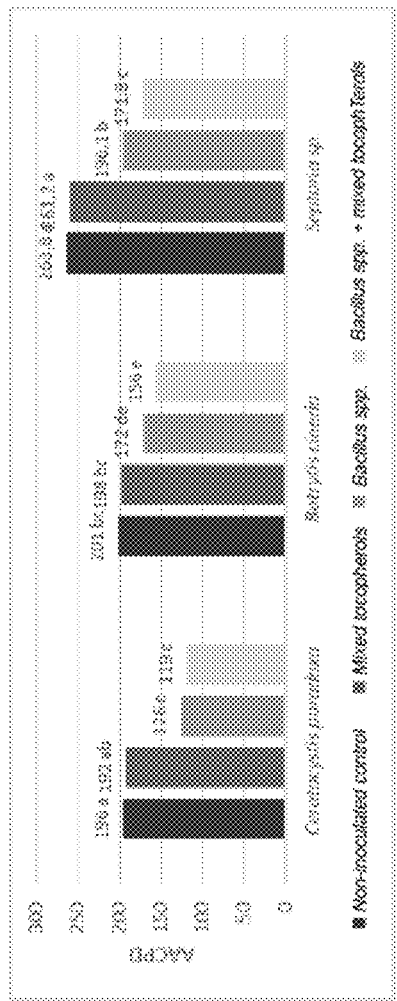

FIG. 3 illustrates the Area Under the Disease Progress Curve (AUDPC)—mycelial growth of the fungi *Ceratocystis paradoxa*, *Botrytis cineria* and *Septoria* sp. in the presence of *Bacillus* spp. and mixed tocopherols.

Figure 4:
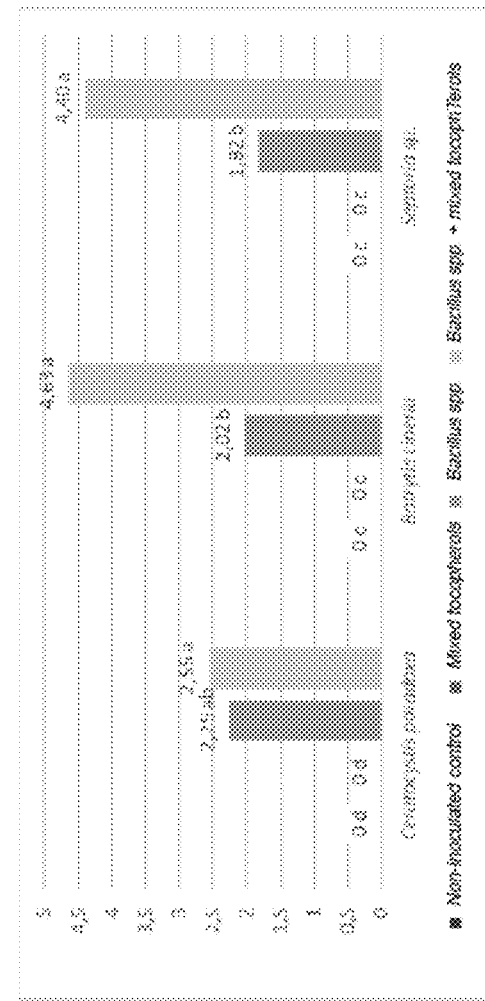

FIG. 4 illustrates the zone of inhibition of the fungi *Ceratocystis paradoxa*, *Botrytis cineria* and *Septoria* sp. in the presence of *Bacillus* spp. and mixed tocopherols.

DETAILED DESCRIPTION OF THE INVENTION

In a preferred embodiment, according to the present invention, in step (A) of the process for producing the agricultural composition the fermentation of the different *Bacillus* by batch occurs for approximately 24-168 hours.

In a preferred embodiment, the method of the present invention comprises the sequential expansion (scaling) of the culture of *Bacillus* spp. for inoculation of the fermentation culture. Preferably, the sequential expansion starts at volumes of 100 mL, which serves as inoculum for about 1 L. This, in its turn, is inoculated in about 10 L, which are then inoculated two flasks in 180 L tanks and, finally, are transferred to reactors containing about 2.000 L.

In a preferred embodiment, the species of *Bacillus* are expanded in flasks of about 100 mL by incubation in orbital agitator from about 80 rpm to about 200 rpm. The incubation time is, preferably, about 8 hours to about 48 hours with air flow of about 0.25 $Nm^3/h$ to about 1.0 $Nm^3/h$ (=4.16-16.67 vvm).

In a preferred embodiment, the air flow of the stainless steel flasks containing about 10 L is from about 0.25 to about 1.5 $Nm^3/h$ (=0.41-2.5 vvm), and the incubation time is preferably about 8 hours to about 48 hours.

In a preferred embodiment, the incubation temperature for multiplication of the three species of *Bacillus* according to the present invention is from about 22° C. to about 38° C.

In a preferred embodiment, the three species of *Bacillus* are inoculated separately in the scaling process up to 180 L and mixed in the 2.000 L fermentors as described for the present invention. For this purpose, in a preferred embodiment, after cultivation in two stainless steel flasks of about 1 L, said flasks are inoculated in two other stainless steel flasks of about 10 L and then transferred to tanks containing about 180 L of specific culture medium for each microorganism, whereby in Table 2 the specific culture medium for the *B. velezensis*; and in Table 3 for the specific culture medium for the *B. pumilus* and *B. subtilis* with the addition of a stainless steel flask containing about 5 L of a solution of endospore formation induction salts for the *Bacillus* spp.

(Table 4), incubated for about 24 to about 168 hours. The air flow is, preferably, from about 1.0 to about 15.0 $Nm^3/h$ (=0.16-1.25 vvm).

In a preferred embodiment, the step of mixing of the three *Bacillus* and the mixed tocopherols in the concentration from about 0.01% to about 1.0% is conducted with temperature from about 22° C. to about 38° C. The air flow is preferably from about 1.0 $Nm^3/h$ to about 2.5 $Nm^3/h$ (=0.0085-0,021 vvm). The pressure is preferably from about 0.5 to about 1.2 $kgf/cm^2$. Agitation is preferably from about 40 hz to about 45 hz.

In a preferred embodiment, the specific culture medium used for culture scaling of the three *Bacillus* and/or the fermentation for the scales of 100 mL, 1 L and 10 L is described according to table 1.

TABLE 1

CULTURE MEDIUM USED FOR THE GROWTH OF *BACILLUS* SPP. UP TO THE SCALE OF 10 L.

| | Reagents | |
|---|---|---|
| 01 | $K_2HPO_4$ | 0.1-4 g |
| 02 | $KH_2PO_4$ | 0.1-4 g |
| 03 | $MgSO_4 \cdot 7H_2O$ | 0.1-0.6 g |
| 04 | NaCl | 0.05-0.3 g |
| 05 | Yeast extract | 0.1-4 g |
| 06 | Peptone | 0.2-4 g |
| 07 | $FeCl_3$ 10% solution | 0.05-1 mL |
| 08 | $MnSO_4$ 10% solution | 0.05-1 mL |
| 09 | Sucrose | 5-10 g |
| 10 | Water | q.s. 1 L | q.s.: quantum suffit.

EXAMPLES

Example 1—Culture Scaling

The different species of *Bacillus* are inoculated separately in flasks containing 100 mL of culture medium as described in Table 1, being incubated in orbital agitator of about 80-200 rpm, at 22-38° C. for approximately 8-48 hours. The next scaling step consists in the inoculation of the stainless steel flasks containing 1 L of culture medium (Table 1), wherein the species are cultivated separately and incubated for approximately 8-48 hours, with air flow of 0.25-1.0 $Nm^3/h$ (=4.16-16.67 vvm) and temperature approximately 22-38° C. After the incubation period, the culture is inoculated in stainless steel flasks containing 10 L of culture medium and incubated for approximately 18-96 hours, with air flow of 0.25-1.5 $Nm^3/h$ (=0.41-2.5 vvm) and temperature varying between 22-38° C.

After this period has lapsed, each culture containing two stainless steel flasks with 10 L of the culture medium is inoculated in a tank containing about 180 L of the specific culture medium for each microorganism, the specific culture medium for *B. velezensis* being represented in Table 2; and in Table 3 the specific culture medium for *B. pumilus* and *B. subtilis* with the addition of a stainless steel flask containing about 5 L of the endospore formation salts solution for the *Bacillus* spp. (Table 4) and incubated for approximately 24-168 hours, with air flow 3.-10.0 $Nm^3/h$ (=0.25-0.83 vvm) and temperature varying between 22-38° C.

TABLE 2

| CULTURE MEDIUM USED FOR GROWTH OF THE *B. VELEZENSIS* FOR THE 200 L TANKS. | | |
|---|---|---|
| | Reagents | |
| 01 | Maltose | 2-20 g |
| 02 | Yeast extract | 1-10 g |
| 03 | NaCl | 1-10 g |
| 04 | Water | q.s. 1 L | q.s.: quantum suffit.

TABLE 3

| CULTURE MEDIUM USED FOR GROWTH OF THE *B. PUMILUS* AND *B. SUBTILIS* FOR THE 200 L TANKS. | | |
|---|---|---|
| | Reagents | |
| 01 | Sodium glutamate | 5-20 g |
| 02 | Peptone | 1-10 g |
| 03 | KCl | 0.1-5 g |
| 04 | $MgSO_4 \cdot 7H_2O$ | 0.1-2 g |
| 05 | Yeast extract | 0.1-5 g |
| 06 | Water | q.s. 1 L | q.s.: quantum suffit.

TABLE 4

| SPORE FORMATION SOLUTION FOR THE THREE TYPES OF *BACILLUS*. | | |
|---|---|---|
| | Reagents | |
| 01 | $Ca(NO_3)_2$ | 50-400 g |
| 02 | $MnCl_2$ | 1.0-10 g |
| 03 | $FeSO_4$ | 0.1-0.8 g |
| 04 | Water | q.s. 1 L | q.s.: quantum suffit.

Example 2—Mixture of *Bacillus* and Mixed Tocopherols in Bioreactor

For the mixture of the three different *Bacillus* and botanical extract in 2.000 L fermentor, preferably the sterilization process uses 1.400 L water with antifoam and is carried out for approximately 60 to 120 minutes, at a temperature of approximately 121° C. to approximately 130° C. Preferably, the sterilization is carried out at a pressure of approximately 1.0-2.0 Kgf/cm 2. The air flow is preferably from about 1.0 $Nm^3/h$ to about 2.5 $Nm^3/h$ (=0.0085-0,021 vvm). The pressure is preferably from about 1.0 to about 1.2 $kgf/cm^2$. Agitation is preferably from about 40 hz to about 45 hz. The mixture of *Bacillus* spp. in its resistance form comprises *Bacillus pumilus* at a concentration of viable endospores from $1.0\times10^7$ to $1.0\times10^9$ UFC/mL, *Bacillus subtilis* at a concentration of viable endospores from $1.0\times10^7$ to $1.0\times10^9$ UFC/mL and *Bacillus velezensis* at a concentration of viable endospores from $1.0\times10^7$ to $1.0\times10^9$ UFC/mL. Preferably, the three species of *Bacillus* containing about 0.01 to about 5% of the mixed tocopherols of vegetable origin, preferably extracted from soybean and sunflower, composed qualitatively by, but not limited to, γ-tocopherol, α-tocopherol, and β-tocopherol, is then inoculated and mixed in the fermentor, preferably from about 30 to about 120 minutes. In step (B) of the process for producing the agricultural composition, the stabilization of this mixture is carried out through the addition of an emulsifier compound, preferably Tween 80 at the proportion from 0.1% to 5.0% (v/v). Preferably, the product is filled in gallons, package in which the product is stored and commercialized.

Example 3 Mixed Tocopherols Enables the Combination of Different Species of *Bacillus* in Protection Against UV-B Radiation It is well known that different species of *Bacillus* even in their resistance form (spores) when exposed to UV-B radiation (280-230 nm) can suffer inactivation. The differentiation of one spore being more resistant than another is linked mainly to their cellular structure. In the *Bacillus* spp. objects of this draft, there was a 43% reduction in cell viability after the radiation for 45 minutes of UV-B light in the absence of the mixed tocopherols (Table 5). Surprisingly, when we add the mixed tocopherols to the *Bacillus* spp. consortium formulation, the mortality rate of the microorganisms is reduced to 29%. This gain in viability of the microorganisms is essential for a product that acts mainly in agricultural crops by foliar spraying allowing greater persistence in nature and promoting greater biofungicide action. Said unexpected effect can be associated to the antioxidant action of the tocopherols protecting the cellular structure of the spores. It is important to emphasize that the industrial process for spore formation is essential for the mixture of different species of *Bacillus* to occur without there being any incompatibility between the microorganisms (FIG. 1). The industrial process for the spore forming induction of step (A) is carried out at a temperature between approximately 22° C. to 37° C. Moreover, there exist several studies on the incompatibility of products based on *Bacillus* with botanical extracts, however, the tocopherols are compatible with the microorganism as demonstrated in FIG. 2, even at high temperatures and for long periods, thus enabling the mixture of two compositions in a single product.

TABLE 5

CONCENTRATION OF *BACILLUS* SPP. CELLS WITH OR WIHOUT MIXED TOCOPHEROLS 45 MINUTES AFTER EXPOSURE TO UV-B LIGHT.

| | Light exposure time UV-B | | |
|---|---|---|---|
| Treatments | 0 h (UFC/mL) | 45 minutes (UFC/mL) | % Reduction |
| *Bacillus* spp. | $1.65 \times 10^6$ | $7.1 \times 10^5$ | 43 |
| *Bacillus* spp. + mixed tocopherols | $1.1 \times 10^6$ | $3.2 \times 10^5$ | 29 |

Example 4—Combination of *Bacillus* Spp. with the Tocopherols Potentializes the Biofungicide Effect (Step (C))

In in vitro trials, the action of the *Bacillus* spp. was evaluated in the area under the disease progress curve (AUDPC) (mycelial growth) against the phytopathogens *Ceratocystis paradoxa, Botrytis cineria* and *Septoria* sp. as presented in FIG. 3. In all the independent trials of the evaluated target, the treatments with the mixed tocopherols did not present any fungicide effect, but as it is added to the product with the *Bacillus* spp. the AUDPC is reduced, thus demonstrating the positive effect thereof in the velocity of the control of the disease. In the same manner, when we evaluate the zones of inhibition of fungi in response to the addition of the *Bacillus* spp. vs. *Bacillus* with mixed tocopherols (FIG. 4), the combination of the microorganisms plus this botanical extract rich in tocopherols present enhanced biofungicide effect when compared to the *Bacillus* spp. in the absence of the mixed tocopherols.

The invention claimed is:

1. A biofungicide agricultural composition comprising a mixture of *Bacillus* spp. in its resistance form and mixed tocopherols of vegetable origin from soybean and sunflower, wherein the mixed tocopherols comprise γ-tocopherol, α-tocopherol, and β-tocopherol, wherein the *Bacillus* are selected from the group consisting of *Bacillus pumilus*, *Bacillus subtilis*, and *Bacillus velezensis*;

which comprises *Bacillus pumilus* at a concentration of viable endospores from $1.0 \times 10^7$ to $1.0 \times 10^9$ UFC/mL, *Bacillus subtilis* at a concentration of viable endospores from $1.0 \times 10^7$ to $1.0 \times 10^9$ UFC/mL and *Bacillus velezensis* at a concentration of viable endospores from $1.0 \times 10^7$ to $1.0 \times 10^9$ UFC/mL; and which comprises 0.01% to 5% mixed tocopherols of vegetable origin.

2. An industrial process for producing the biofungicide agricultural composition of claim 1, comprising the steps of:
   (a) industrial fermentation culture process and endospore formation induction of three different species of *Bacillus* comprising *B. pumilus*, *B. subtilis* and *B. velezensis* through the application of a modality of osmotic stress for obtaining an agricultural composition with biofungicide effect;
   (b) stabilization of a biotechnological product, comprised of a mixture of bacterial cells with mixed tocopherols of vegetable origin, in a technical solution that allows the mixture of the parts with high stability, presented in a single packaging; and
   (c) potentializing of the biofungicide mechanisms of the product with different species of *Bacillus* against phytopathogens.

3. The industrial process of claim 2, wherein the endospore formation induction of step (a) occurs in the tank environment, and
   wherein the endospore formation induction of step (a) is carried out at a temperature of 22° C. to 37° C., and carried out at an air flow of 3.0 Nm$_3$/h (0.25 vvm) to 10.0 Nm$^3$/h (=0.83 vvm).

4. The industrial process of claim 2, wherein the fermentation of the culture is by batch;
   the fermentation step is carried out with a pressure from about 1.0 to about 2.0 kgf/cm$^2$;
   the fermentation step is carried out with agitation from about 40 hz to about 45 hz;
   the fermentation step is carried out with temperature from about 27° C. to about 37° C.; and
   the fermentation step is carried out with air flow from about 1.0 Nm$^3$/h to about 2.5 Nm$^3$/h (=0.0085–0.021 vvm).

5. The industrial process of claim 2, further comprising the sequential expansion of the culture of different *Bacillus* spp. for the inoculation of the fermentation culture, wherein the sequential expansion is made in volumes from about 100 mL to about 10 L or from about 180 L to about 2000 L.

6. The industrial process of claim 2, wherein the species of *Bacillus* are inoculated separately.

7. The industrial process of claim 2, wherein the species of *Bacillus* are expanded by incubation in orbital agitator at about 80 rpm to about 200 rpm;
   the species of *Bacillus* are expanded by incubation for about 8 hours to about 48 hours; and
   the species of *Bacillus* are expanded in stainless steel flasks containing about 1 L of culture medium and about 10 L of culture medium.

8. The industrial process of claim 7, wherein the species are incubated for 8 hours to about 48 hours; and
   the species are incubated with an air flow from about 0.25 Nm$^3$/h to about 1.0 Nm$^3$/h (=4.16–16.67 vvm) for 1 L for culture medium and air flow from about 0.25 Nm$^3$/h to about 1.0 Nm$^3$/h (=0.41–1.67 vvm) for 10 L of culture medium.

9. The industrial process of claim 7, wherein after the segregated cultivation of the species in two stainless steel flasks of about 10 L, said two flasks are inoculated in tanks containing about 180 L of culture medium.

10. The industrial process of claim 9, wherein the species are incubated for about 24 to about 168 hours; and the species are incubated with air flow from about 1.0 to about 15.0 Nm$^3$/h (=0.16–1.25 vvm).

11. The industrial process of claim 2, wherein the incubation temperature for multiplication of the three species of *Bacillus* is from about 22° C. to about 38° C.

12. The industrial process of claim 2, wherein the step of mixture of *Bacillus* spp. and mixed tocopherols of vegetable origin is carried out from about 30 to about 120 minutes.

13. The industrial process of claim 2, wherein the stabilization process of the product of step (b) is carried out by means of the addition of an emulsifier compound at the proportion comprised by the gradient from 0.1 to 5.0% (v/v).

14. A method for using the biofungicide agricultural composition of claim 1, wherein the use thereof is for application in several agricultural cultivations;
   the use thereof is for application via foliar spraying; and
   the use thereof is for UV-B protection of the two or more species of *Bacillus* spp.

* * * * *